US009262849B2

(12) United States Patent
Fan et al.

(10) Patent No.: US 9,262,849 B2
(45) Date of Patent: Feb. 16, 2016

(54) CHART ANIMATION

(75) Inventors: Kevin Fan, Bellevue, WA (US); Damien Berger, Enumclaw, WA (US); Peter Hufnagel, Seattle, WA (US); Bide Hu, Bellevue, WA (US); Justin Dallal, Redmond, WA (US); Monica Poinescu, Renton, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 119 days.

(21) Appl. No.: 13/295,567

(22) Filed: Nov. 14, 2011

(65) Prior Publication Data

US 2013/0120358 A1    May 16, 2013

(51) Int. Cl.
*G06T 11/20* (2006.01)
*G06T 13/00* (2011.01)

(52) U.S. Cl.
CPC .............. *G06T 11/206* (2013.01); *G06T 13/00* (2013.01)

(58) Field of Classification Search
CPC ... G06F 17/24; G06F 3/04883; G06F 3/0488; G06F 17/21; G06F 17/30905
USPC ........................................................ 347/473
See application file for complete search history.

(56) References Cited

U.S. PATENT DOCUMENTS

| 6,995,768 B2 | 2/2006 | Jou et al. | |
| 2002/0172377 A1* | 11/2002 | Dideriksen et al. | 381/98 |
| 2006/0075335 A1* | 4/2006 | Gloor | 715/526 |
| 2006/0095850 A1* | 5/2006 | Miller et al. | 715/719 |
| 2007/0244990 A1* | 10/2007 | Wells | 709/218 |
| 2008/0303827 A1* | 12/2008 | Schiff | 345/473 |
| 2010/0005411 A1 | 1/2010 | Duncker et al. | |
| 2010/0079461 A1* | 4/2010 | Breeds et al. | 345/440 |
| 2010/0277507 A1 | 11/2010 | Allyn et al. | |
| 2010/0302278 A1* | 12/2010 | Shaffer et al. | 345/659 |
| 2011/0096077 A1 | 4/2011 | Jarrett et al. | |

FOREIGN PATENT DOCUMENTS

| CN | 101460943 A | 6/2009 |
| CN | 101681523 A | 3/2010 |

OTHER PUBLICATIONS

"Animated Transitions in Statistical Data Graphics" by Jeffrey Heer, George G. Robertson—IEEE Transactions on Visualization and Computer Graphics, Vol. 13, No. 6, Nov./Dec. 2007, pp. 1240-1257.*
Animated Transitions in Statistical Data Graphics by Jeffrey Heer Nov. 2007 Stanford University Visualization and Computer Graphics, IEEE pp. 1-8.*

(Continued)

*Primary Examiner* — James A Thompson
(74) *Attorney, Agent, or Firm* — Danielle Johnston-Holmes; Damon Rieth; Micky Minhas

(57) ABSTRACT

Chart animation control may be provided. Upon receiving a change to a displayed visualization comprising a plurality of data elements, a determination may be made as to whether to animate an update of the visualization according to the change to the displayed visualization. In response to determining to animate the update of the visualization according to the change to the data value, an animation of the update may be constructed and rendered and the updated visualization may be displayed.

19 Claims, 3 Drawing Sheets

(56) References Cited

OTHER PUBLICATIONS

Anson, David, Delay's Blog—Written Jan. 13, 2010; Retrieved Aug. 31, 2011. Website: http://blogs.msdn.com/b/delay/archive/2010/01/13/i-feel-the-need-the-need-for-speed-seven-simple-performance-boosting-tweaks-for-common-silverlight-wpf-charting-scenarios.aspx; 8 pages.

Beaumont, Jesse; Optimising Visiblox Charts Performance, Written Jan. 12, 2011; Retrieved Aug. 30, 2011. Website: http://www.visiblox.com/blog/2011/01/optimising-visiblox-charts-performance; 5 pages.

ProModel User's Guide entitled "Running the Model" Retrieved on Aug. 30, 2011. Website: http://www.geocities ws/io2_jonathan/C-11.pdf; pp. 567-616; 50 pages.

"First Office Action and Search Report Received for Chinese Patent Application No. 201210454198.1", Mailed Date: Oct. 22, 2014, 16 Pages.

"Third Office Action Received for China Patent Application No. 201210454198.1", Mailed Date: Aug. 27, 2015, 10 Pages.

"Second Office Action Issued in Chinese Patent Application No. 201210454198.1", Mailed Date: Mar. 10, 2015, 9 Pages.

\* cited by examiner

CHART ANIMATION

BACKGROUND

Chart animation control may be provided. In conventional systems, chart updates often come with a jarring appearance change. For example, a chart re-layout based on a data change event can be disruptive to a user's experience. Simple user interface information, such as text, does not explain this the way animation could if bars animated to their new locations. Conventional systems do not provide this animation, and consequently the user experience is less responsive, interactive, and enjoyable.

SUMMARY

This Summary is provided to introduce a selection of concepts in a simplified form that are further described below in the Detailed Description. This Summary is not intended to identify key features or essential features of the claimed subject matter. Nor is this Summary intended to be used to limit the claimed subject matter's scope.

Chart animation control may be provided. Upon receiving a change to a displayed visualization comprising a plurality of data elements, a determination may be made as to whether to animate an update of the visualization according to the change to the displayed visualization. In response to determining to animate the update of the visualization according to the change to the data value, an animation of the update may be constructed and rendered and the updated visualization may be displayed.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and subcombinations described in the detailed description.

BRIEF DESCRIPTION OF THE DRAWINGS

The accompanying drawings, which are incorporated in and constitute a part of this disclosure, illustrate various embodiments of the present invention. In the drawings.

DETAILED DESCRIPTION

Figure 1:
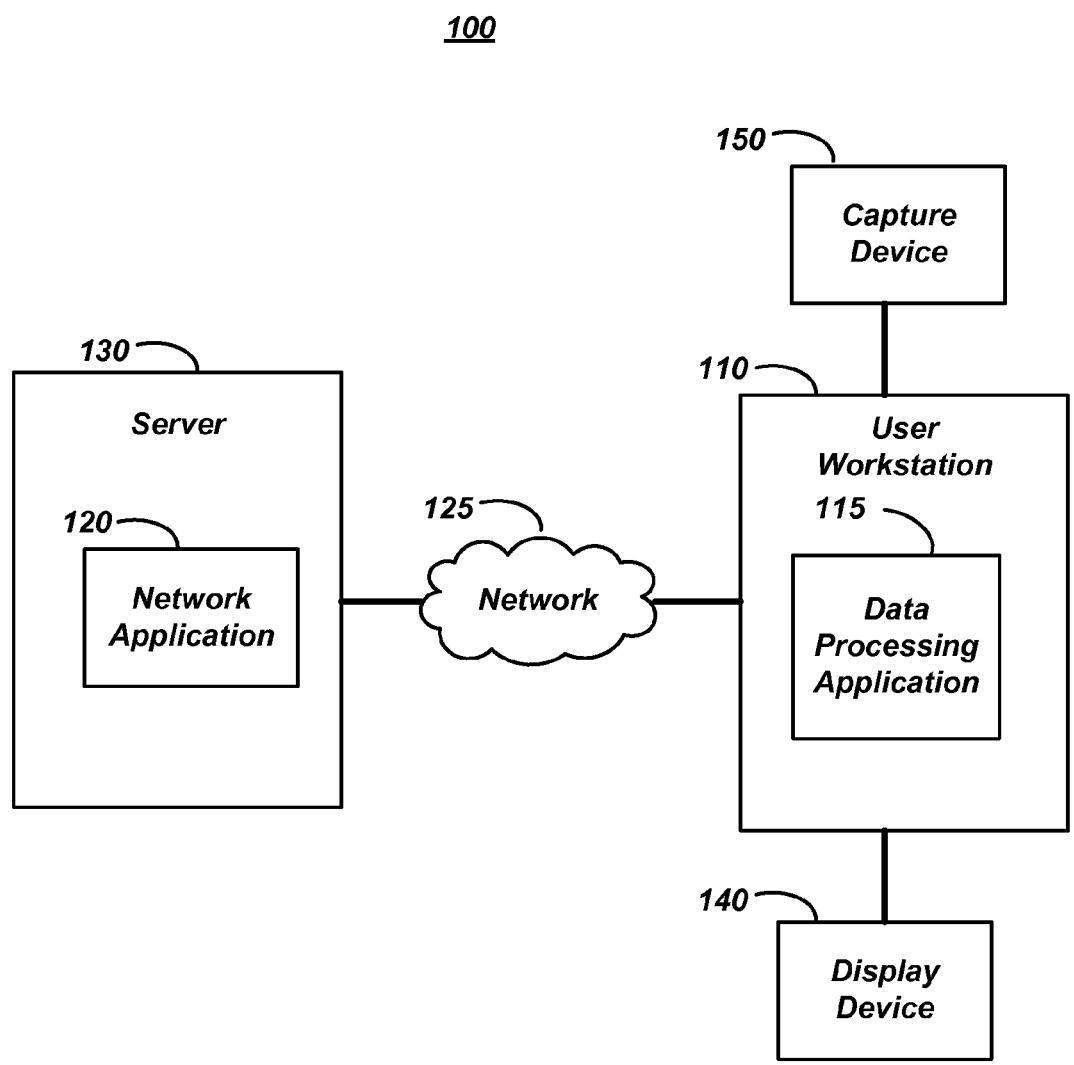
FIG. 1 is a block diagram of an operating environment.

The following detailed description refers to the accompanying drawings. Wherever possible, the same reference numbers are used in the drawings and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention.

Chart animation may provide a smooth and continuous transition between two states of a chart graphic. Such an animation may be broken up into two high level stages—storyboard construction and animation execution (animation preparation and animation playing). In the storyboard construction phase, a layout engine may provide key frames of the animation and identify data elements that need to animate. In the execution phase, the animation may be rendered and output to a user's display. Data elements may comprise those parts of the chart that represent a series value, such as the bars of a bar chart, the columns of a column chart, the lines of a line chart, the points of a scatter chart, etc.

Three cutoffs may be put in place to determine whether the chart goes forth with animation, or whether it forgoes animation. A first cutoff may be used, for example, to prevent a long storyboard construction time. A second cutoff may be used to prevent a low Frames Per Second (FPS) animation. A third cutoff may be used provide a failsafe to prevent a runaway storyboard construction phase. The animation execution phase may be configured to last a fixed time period. If the animation is very expensive to construct and/or render, frames may be dropped rather than lag and push out the completion time.

The animation cutoffs may be used to prevent two scenarios: (1) the user waiting a long time for the animation to occur (e.g., storyboard construction takes a long time), and (2) the user seeing a low-performance animation (e.g., low FPS in the animation execution). The cutoffs may attempt to make decisions about the above two scenarios as soon as possible using the information that is readily available to them at a given time.

For example, at cutoff 1 (right at the very beginning), information may be limited to details about the visualization, such as the number of points, the number of series, the effects applied, etc. Thus those variables may be used to make an educated guess at the length of storyboard construction and/or FPS. Consistent with embodiments of the invention, the first cutoff may have more leeway in it because limited information is available.

At a second cutoff, when the storyboard has been constructed, more information is known about the animation, such as which elements are moving, and what type of movement they're going to perform. That information may be used to more granularly predict the two scenarios.

Animation cutoffs may be based on various factors, such as binary rules (e.g., if a condition is true, don't animate), heuristic rules, and/or sampling based rules. An example binary cutoff rule may comprise evaluating whether more than a threshold number of data elements would need to be animated or whether a change to the visualization requires fully rerendering the visualization. Heuristic rules may, for example, evaluate graphical properties of the chart to determine whether those properties would have a deleterious effect on the animation's performance and/or score the "expensiveness" of an animation by associating "expensiveness" multipliers to variables that affect frames per second (FPS) such as shape effects applied to view elements animating and the nature of the view element animation (e.g. translation vs. property change). By testing the effect each of these variables has on FPS, a multiplier may be calculated for each according to their impact on FPS. For example, if bevel effects, on average, reduce FPS by 50%, then an expensiveness factor of 1.5 may be associated with bevels. If the score surpasses a threshold value that may be determined for a given computing system's performance ability, the animation may be deemed too expensive the update may not be animated.

A sampling cutoff rule may start with the end state of the chart, rewind to the initial state of the chart by applying "anti-actions" to it and then play through the animation proper. The first clock tick may be spent applying the "anti-actions" to the final chart to return it to its initial state as well as drawing the initial state of the chart. By measuring the time it takes to apply the "anti-actions" and draw the first frame, a representative idea may be calculated of how long it will take to generate the other frames, which similarly involve applying actions to the chart and then drawing. If the time it takes for this first frame is very long, then the FPS will likely be very low, and the update may not be animated.

A heuristic cutoff rule may also be used. For example, if a particular chart animates at a poor frame rate more than a threshold number of times, then future updates to that chart may be pre-empted from animating. Similarly, if a particular computing device experiences poor animation performance, the conditions that result in the poor performance may be evaluated. For example, a lower-end graphical display device may be present that impacts all animations and/or animations may suffer when the computing device has a high processing load or low amount of free memory. These conditions may be incorporated into the heuristic cutoff rule and may result in not animating the update when those conditions obtain.

FIG. 1 is a block diagram of an operating environment 100 for providing chart animation control comprising a user workstation 110. User workstation 110 may comprise a data processing application 115 and may be operative to interact with a network application 120 via a network 125. Data processing application 115 may comprise, for example a word processing, spreadsheet, presentation and/or other productivity application. For example, user workstation 110 may be operative to connect to a spreadsheet application provided by a cloud-based server 130 that may receive inputs from user workstation 110 and perform the necessary data processing remotely from user workstation 110. User workstation 110 may be operative to output application data and/or user interfaces to a display device 140, such as a monitor and/or touchscreen. User workstation 110 may comprise, for example, an electronic communications device such as a computer, laptop, cellular and/or IP phone, tablet, game console and/or other device. User workstation 110 may be coupled to a capture device 150 that may be operative to record a user and capture spoken words, motions and/or gestures made by the user, such as with a camera and/or microphone. User workstation 110 may be further operative to capture other inputs from the user such as by a keyboard, touchscreen, stylus and/or mouse (not pictured). Consistent with embodiments of the invention, capture device 150 may comprise any speech and/or motion detection device capable of detecting the speech and/or actions of the user. For example, capture device 150 may comprise a Microsoft® Kinect® motion capture device comprising a plurality of cameras and a plurality of microphones.

Figure 2:
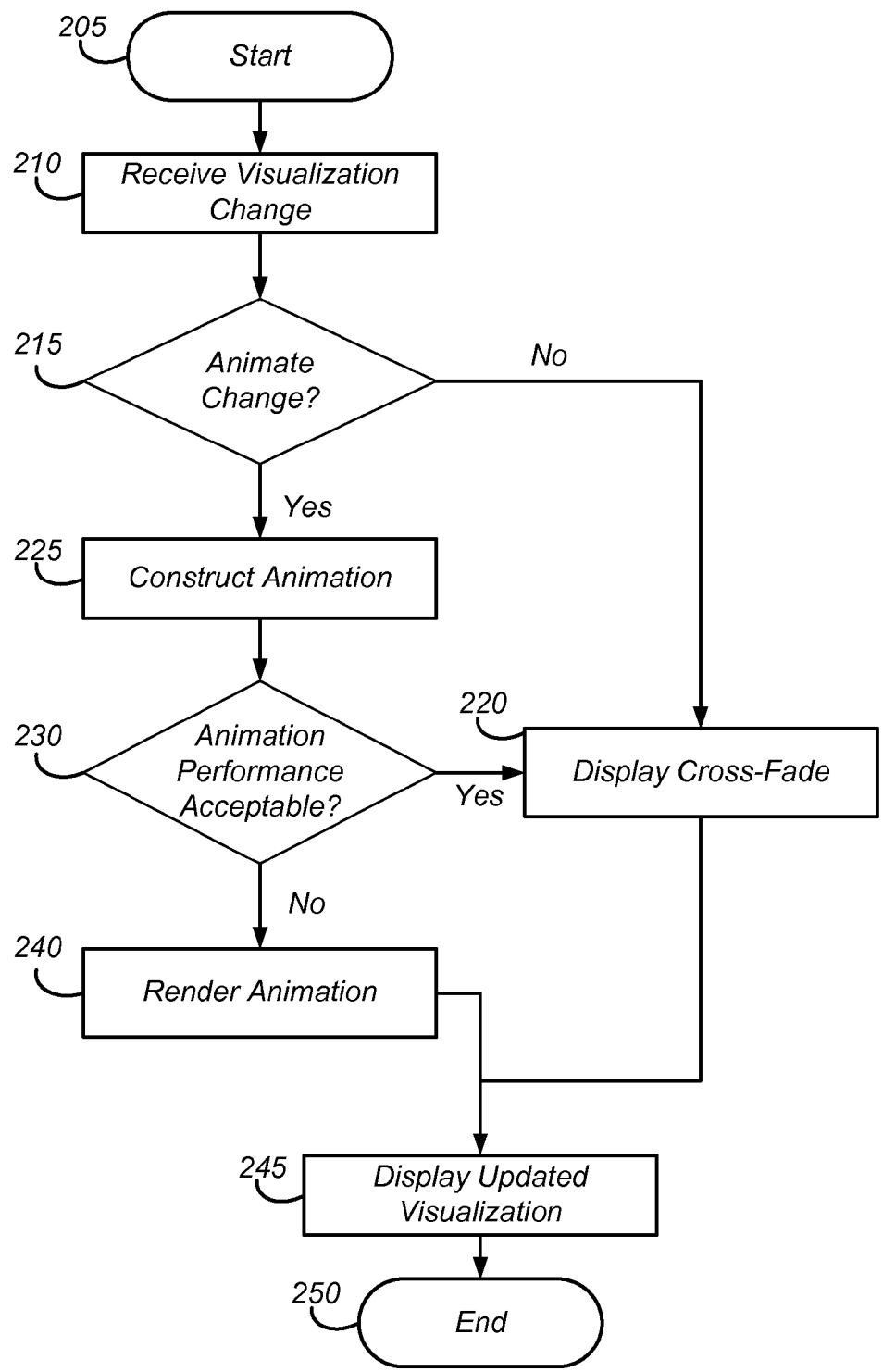
FIG. 2 is a flow chart of a method for providing chart animation control.

FIG. 2 is a flow chart setting forth the general stages involved in a method 200 consistent with an embodiment of the invention for providing chart animation control. Method 200 may be implemented using a computing device 300 as described in more detail below with respect to FIG. 3. Ways to implement the stages of method 200 will be described in greater detail below. Method 200 may begin at starting block 205 and proceed to stage 210 where computing device 300 may receive a change to a displayed visualization. The visualization may comprise, for example a chart, table, and/or graph comprising a plurality of data elements associated with a plurality of underlying data values. The change may comprise, for example, a resizing of the visualization and/or a change to one or more of the underlying data values.

Method 200 may then advance to stage 215 where computing device 300 may determine whether to construct an animated update of the visualization according to the change. For example, data processing application 115 may evaluate a binary cutoff rule and/or calculate a performance cost of rendering the application. The binary cutoff rule may comprise, for example, whether the visualization comprises a bevel effect, whether the visualization comprises a 3-D effect, whether the visualization comprises a shadow effect, whether the visualization comprises a number of data points greater than a first threshold value, and whether the visualization comprises a number of data elements greater than a second threshold value.

In response to determining not to construct the animated update of the visualization, method 200 may advance to stage 220 where computing device 300 may display a cross-fade to an updated visualization. For example, the previous version of the visualization may fade out on display device 140 while the updated version of the visualization fades into view.

Otherwise, method 200 may advance to stage 225 where computing device 300 may construct the animated update of the visualization. For example, user workstation 110 may storyboard each frame of the animation. The animation may comprise, for example, two data elements of the visualization moving to new positions. The total animation time may comprise a target duration (e.g., 3 seconds) at a target number of frames per second (e.g., 30 fps). The construction may prepare key frames of the 90 frames needed for such an animation.

Method 200 may then advance to stage 230 where computing device 300 may determine whether the animation performance will be acceptable. For example, user workstation 110 may determine whether construction of the required frames exceeds a threshold time (e.g., 30 ms). If the construction exceeds the threshold time, construction may be aborted and method 200 may advance to stage 220, as described above. For another example, user workstation 110 may determine whether the animation will result in a sufficiently high frames-per-second display.

Otherwise, method 200 may then advance to stage 240 where computing device 300 may render the animation of the update. For example, the storyboarded frames may be sent to a graphical subsystem of user workstation 110 to be rendered into drawing instructions and output to display device 140.

After displaying the cross-fade at stage 220 or the rendered animation at stage 245, method 200 may advance to stage 245 where computing device 300 may display the updated visualization. Method 200 may then end at stage 250.

An embodiment consistent with the invention may comprise a system for providing chart animation control. The system may comprise a memory storage and a processing unit coupled to the memory storage. The processing unit may be operative to receive a change to a displayed visualization, determine whether to animate an update of the visualization according to the change to the displayed visualization, and in response to determining to animate the update of the visualization according to the change to the data value, construct an animation of the update, render the animation of the update, and display the updated visualization.

Another embodiment consistent with the invention may comprise a system for providing chart animation control. The system may comprise a memory storage and a processing unit coupled to the memory storage. The processing unit may be operative to receive a change to a displayed visualization, determine whether to animate an update of the visualization according to at least one first animation decision rule, and in response to determining to animate the update of the visualization according to the change to the data value, construct an animation of the update. The processing unit may be further operative to determine whether to display the constructed animation of the update according to at least one second animation decision rule and, in response to determining to display the constructed animation, render the animation of the update, and display the updated visualization.

Yet another embodiment consistent with the invention may comprise a system for providing chart animation control. The system may comprise a memory storage and a processing unit coupled to the memory storage. The processing unit may be operative to receive a change to a displayed visualization, wherein the visualization comprises a plurality of data elements associated with an plurality of underlying data values, and determine whether to construct an animated update of the visualization according to the change. Being operative to determine whether to construct the animated update may comprise the processing unit being operative to evaluate a binary cutoff rule and calculate a performance cost of rendering the animation. Binary cutoff rules may comprise, for example, whether the visualization comprises a bevel effect, whether the visualization comprises a 3-D effect, whether the visualization comprises a shadow effect, whether the visualization comprises a number of data points greater than a first threshold value, and whether the visualization comprises a number of data elements greater than a second threshold value. In response to determining not to construct the animated update of the visualization, the processing unit may be operative to display a cross-fade to an updated visualization. Otherwise, the processing unit may be operative to construct an animation of the update and determine whether construction of the animation exceeds a threshold time. In response to determining that construction of the animation exceeds the threshold time, the processing unit may be operative to display a cross-fade to an updated visualization. Otherwise, the processing unit may be operative to render the animation of the update and display the updated visualization.

Figure 3:
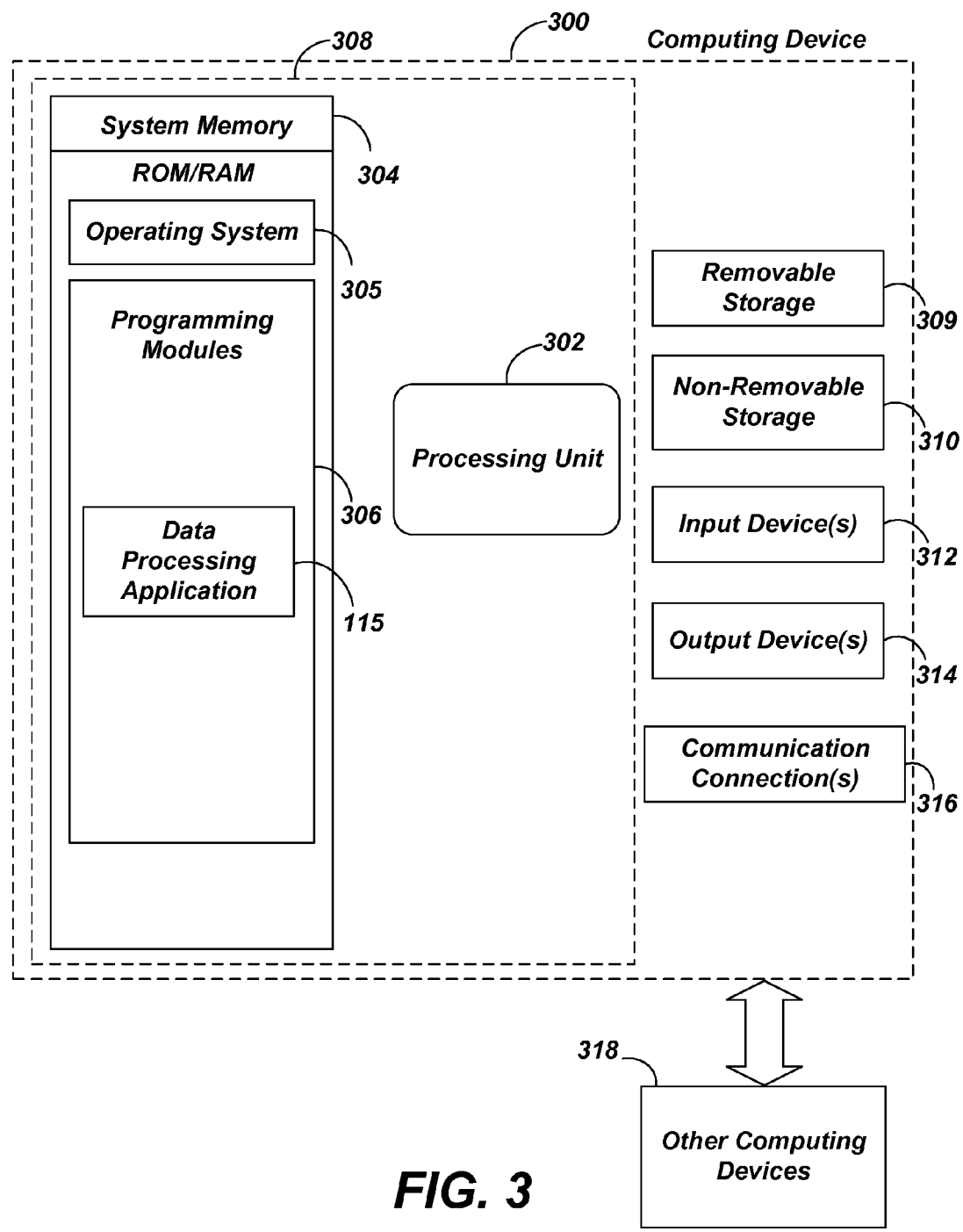
FIG. 3 is a block diagram of a computing device.

FIG. 3 is a block diagram of a system including computing device 300. Consistent with an embodiment of the invention, the aforementioned memory storage and processing unit may be implemented in a computing device, such as computing device 300 of FIG. 3. Any suitable combination of hardware, software, or firmware may be used to implement the memory storage and processing unit. For example, the memory storage and processing unit may be implemented with computing device 300 or any of other computing devices 318, in combination with computing device 300. The aforementioned system, device, and processors are examples and other systems, devices, and processors may comprise the aforementioned memory storage and processing unit, consistent with embodiments of the invention. Furthermore, computing device 300 may comprise operating environment 300 as described above. Methods described in this specification may operate in other environments and are not limited to computing device 300.

With reference to FIG. 3, a system consistent with an embodiment of the invention may include a computing device, such as computing device 300. In a basic configuration, computing device 300 may include at least one processing unit 302 and a system memory 304. Depending on the configuration and type of computing device, system memory 304 may comprise, but is not limited to, volatile (e.g. random access memory (RAM)), non-volatile (e.g. read-only memory (ROM)), flash memory, or any combination. System memory 304 may include operating system 305, one or more programming modules 306, and may include data processing application 115. Operating system 305, for example, may be suitable for controlling computing device 300's operation. Furthermore, embodiments of the invention may be practiced in conjunction with a graphics library, other operating systems, or any other application program and is not limited to any particular application or system. This basic configuration is illustrated in FIG. 3 by those components within a dashed line 308.

Computing device 300 may have additional features or functionality. For example, computing device 300 may also include additional data storage devices (removable and/or non-removable) such as, for example, magnetic disks, optical disks, or tape. Such additional storage is illustrated in FIG. 3 by a removable storage 309 and a non-removable storage 310. Computing device 300 may also contain a communication connection 316 that may allow device 300 to communicate with other computing devices 318, such as over a network in a distributed computing environment, for example, an intranet or the Internet. Communication connection 316 is one example of communication media.

The term computer readable media as used herein may include computer storage media. Computer storage media may include volatile and nonvolatile, removable and non-removable media implemented in any method or technology for storage of information, such as computer readable instructions, data structures, program modules, or other data. System memory 304, removable storage 309, and non-removable storage 310 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 300. Any such computer storage media may be part of device 300. Computing device 300 may also have input device(s) 312 such as a keyboard, a mouse, a pen, a sound input device, a touch input device, etc. Output device(s) 314 such as a display, speakers, a printer, etc. may also be included. The aforementioned devices are examples and others may be used.

The term computer readable media as used herein may also include communication media. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

As stated above, a number of program modules and data files may be stored in system memory 304, including operating system 305. While executing on processing unit 302, programming modules 306 (e.g., data processing application 115) may perform processes and/or methods as described above. The aforementioned process is an example, and processing unit 302 may perform other processes. Other programming modules that may be used in accordance with embodiments of the present invention may include electronic mail and contacts applications, word processing applications, spreadsheet applications, database applications, slide presentation applications, drawing or computer-aided application programs, etc.

Generally, consistent with embodiments of the invention, program modules may include routines, programs, components, data structures, and other types of structures that may perform particular tasks or that may implement particular abstract data types. Moreover, embodiments of the invention may be practiced with other computer system configurations, including hand-held devices, multiprocessor systems, microprocessor-based or programmable consumer electronics, minicomputers, mainframe computers, and the like. Embodiments of the invention may also be practiced in distributed computing environments where tasks are performed by remote processing devices that are linked through a communications network. In a distributed computing environment, program modules may be located in both local and remote memory storage devices.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Embodiments of the invention, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present invention may be embodied in hardware and/or in software (including firmware, resident software, micro-code, etc.). In other words, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of the invention may be practiced via a system-on-a-chip (SOC) where each and/or many of the components illustrated above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any component of operating environment 100 may operate via application-specific logic integrated with other components of the computing device/system on the single integrated circuit (chip).

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the invention have been described, other embodiments may exist. Furthermore, although embodiments of the present invention have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the invention.

All rights including copyrights in the code included herein are vested in and the property of the Applicants. The Applicants retain and reserve all rights in the code included herein, and grant permission to reproduce the material only in connection with reproduction of the granted patent and for no other purpose.

While certain embodiments of the invention have been described, other embodiments may exist. While the specification includes examples, the invention's scope is indicated by the following claims. Furthermore, while the specification has been described in language specific to structural features and/or methodological acts, the claims are not limited to the features or acts described above. Rather, the specific features and acts described above are disclosed as example for embodiments of the invention.

We claim:

1. A method for providing chart animation control, the method comprising:
   receiving a change to a displayed visualization, wherein the visualization comprises a chart, the chart comprising a plurality of data elements, the plurality of data elements comprising parts of the chart that represent a series value;
   determining to animate an update of the visualization according to the change to the displayed visualization, the determination including determining that a storyboard construction of required frames does not exceed a threshold time and determining that a count of the plurality of data elements comprising the parts of the chart that represent the series value does not exceed a threshold count number;
   in response to determining to animate the update of the visualization according to the change:
   constructing storyboards of the required frames of an animation of the update,
   rendering the animation of the update, displaying the animation of the update, and displaying the update of the visualization after the displaying of the animation of the update.

2. The method of claim 1, wherein the determination further comprises determining that a render time of the animation does not exceed a threshold time.

3. The method of claim 1, wherein the determination further comprises determining that the change to the displayed visualization is not associated with a preconfigured animation rule that prevents the animation.

4. The method of claim 3, wherein the change comprises a user adjustment of at least one of the following: an x-axis size, a y-axis size, and a display size of the visualization.

5. The method of claim 3, wherein the change comprises a change to one or more underlying data values.

6. The method of claim 3, wherein the animation of the update is at least one of a translation or a property change.

7. A system for providing chart animation control, the system comprising:

a memory storage; and a processing unit coupled to the memory storage, wherein the processing unit is operable to:

receive a change to a displayed visualization, wherein the visualization comprises a chart, the chart comprising a plurality of data elements, the plurality of data elements comprising parts of the chart that represent a series value, determine to animate an update of the visualization according to at least one first animation decision rule, the at least one first animation decision rule comprising determining that storyboard construction of required frames does not exceed a threshold time, in response to determining to animate the update of the visualization, construct an animation of the update by constructing storyboards of the required frames, determine to display the constructed animation of the update according to at least one second animation decision rule, wherein the at least one second animation decision rule comprises determining that a total animation time is less than a target duration and meets a target number of frames per second, in response to determining to display the constructed animation, render and display the animation of the update, and display the update of the visualization after the constructed animation has been displayed.

8. The system of claim 7, wherein the at least one first animation decision rule further comprises a binary cutoff rule.

9. The system of claim 7, wherein the at least one first animation decision rule further comprises a performance heuristic cutoff rule.

10. The system of claim 9, wherein the performance heuristic cutoff rule calculates a performance cost of rendering the animation of the update.

11. The system of claim 10, wherein the performance cost comprises a reduction in frames per second.

12. The system of claim 9, wherein the performance heuristic cutoff rule comprises a system performance history.

13. The system of claim 7, wherein the at least one first animation decision rule is a count of the plurality of data elements comprising the parts of the chart that represent the series value that does not exceed a threshold number of data elements.

14. The system of claim 7, wherein the at least one first animation decision rule determines a number of data points greater than a threshold value.

15. The system of claim 7, wherein the change comprises a user adjustment of at least one of the following: an x-axis size, a y-axis size, and a display size of the visualization.

16. The system of claim 7, wherein the change comprises a change to one or more underlying data values.

17. A system for providing chart animation control, the system comprising:

a memory storage; and a processing unit coupled to the memory storage, wherein the processing unit is operable to:

receive a change to a displayed visualization, wherein the visualization comprises a chart, the chart comprising a plurality of data elements, the plurality of data elements comprising parts of the chart that represent a series value;

determine not to animate an update of the visualization according to the change to the displayed visualization, the determination being based on determining that storyboard construction of required frames exceeds a threshold time wherein in determining not to animate the update the processing unit is further operable to:

evaluate at least one binary cutoff rule, and calculate a performance cost of rendering an animation of the update; and in response to the determination not to animate the update of the visualization, display a cross-fade to an updated visualization.

18. The system of claim 17, wherein the change comprises a user adjustment of at least one of the following: an x-axis size, a y-axis size, and a display size of the visualization.

19. The system of claim 17, wherein the change comprises a change to one or more underlying data values.

* * * * *